(12) United States Patent
Folgoas et al.

(10) Patent No.: US 11,507,218 B2
(45) Date of Patent: Nov. 22, 2022

(54) DUAL INTERFACE SMART DEVICE

(71) Applicants: SOCIÉTÉ BIC, Clichy (FR); BIC VIOLEX S.A., Anoixi (GR)

(72) Inventors: Loic Folgoas, Clichy (FR); Georgios Georgakis, Anoixi (GR)

(73) Assignees: SOCIÉTÉ BIC, Clichy (FR); BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 17/367,843

(22) Filed: Jul. 6, 2021

(65) Prior Publication Data
US 2022/0011898 A1 Jan. 13, 2022

(30) Foreign Application Priority Data
Jul. 7, 2020 (EP) .................................. 20305770

(51) Int. Cl.
*G06F 3/041* (2006.01)
*G06F 3/0354* (2013.01)
*G06F 3/046* (2006.01)
*G06F 3/0484* (2022.01)
*G06F 3/0488* (2022.01)

(52) U.S. Cl.
CPC ........ *G06F 3/0416* (2013.01); *G06F 3/03545* (2013.01); *G06F 3/046* (2013.01); *G06F 3/0484* (2013.01); *G06F 3/0488* (2013.01)

(58) Field of Classification Search
CPC .... G06F 3/0416; G06F 3/03545; G06F 3/046; G06F 3/0484; G06F 3/0488; G06F 1/1637; G06F 1/1643; G06F 1/1647; G06F 1/1692; G06F 1/1626
See application file for complete search history.

(56) References Cited

U.S. PATENT DOCUMENTS

| | | | |
|---|---|---|---|
| 2015/0022458 A1* | 1/2015 | Kelso ................... | G06F 1/1643 345/173 |
| 2016/0195975 A1* | 7/2016 | Baum ................ | G06F 3/03545 345/173 |
| 2016/0364138 A1* | 12/2016 | Luo ....................... | G06F 1/1626 |
| 2019/0042066 A1* | 2/2019 | Kim ...................... | G06F 1/1649 |
| 2019/0204871 A1 | 7/2019 | Seo et al. | |

OTHER PUBLICATIONS

Extended European Search Report issued in European Patent Application No. 20305770.8, dated Sep. 28, 2020.

* cited by examiner

*Primary Examiner* — Mark W Regn
(74) *Attorney, Agent, or Firm* — Bookoff McAndrews, PLLC

(57) ABSTRACT

A smart device comprising a first interface configured to transmit a first input from a user, a second interface configured to transmit a second input from the user, a digitizer positioned between the first interface and the second interface, and wherein the digitizer is configured to receive the first input from the user through the first interface and the second input from the user through the second interface.

20 Claims, 2 Drawing Sheets

DUAL INTERFACE SMART DEVICE

CROSS REFERENCE TO RELATED APPLICATIONS

This application claims benefit from European patent application EP20305770.8 filed on 7 Jul. 2020, its content being incorporated herein by reference.

FIELD

The present disclosure relates generally to the field of electronic devices. More specifically, the present disclosure relates to an electronic device configured to convert an analog input into a digital format.

BACKGROUND

A typical graphics smart device, e.g. tablet, smartphone, smartwatch, wearables, and the like may have a flat surface and/or a screen on or at which a user may write and/or draw words, an image, an animation, a graphic, or the like using a pen-like drawing instrument. A resulting word, image, animation, graphic, or the like may be displayed on a computer monitor and/or on the screen of the smart device. Currently available smart devices which include two surfaces and/or screens, at which the user may write and/or draw, may require the use of more than one digitizer to convert analog writing and/or drawing input, at both surfaces and/or screens, into digital format. A smart device including more than one digitizer may be costly to produce, and thus expensive for a consumer. As such, it is desirable to provide an improved smart device configured to include two writing and/or drawing interfaces, which function with a common digitizer, in order to reduce costs associated with production and sale of the smart device.

SUMMARY

According to aspects of the disclosure, a smart device comprises a first interface configured to transmit a first input from a user, a second interface configured to transmit a second input from the user, a common digitizer positioned between the first interface and the second interface, and wherein the common digitizer is configured to receive the first input from the user through the first interface and the second input from the user through the second interface.

According to aspects of the disclosure, the common digitizer may be positioned between the first interface and the second interface in a sandwiched relationship.

According to aspects of the disclosure, the common digitizer includes an electromagnetic resonance panel configured to detect a position of the first input at the first interface and a position of the second input at the second interface. The electromagnetic resonance panel includes a plurality of sensors each configured to generate the magnetic field and detect the magnetic field at a preset resonance frequency, the sensors being arranged in a series of horizontal axis sensors and a series of vertical axis sensors which overlap and/or alternate in a grid pattern.

According to aspects of the disclosure, the electromagnetic resonance sensing panel may be configured to generate a magnetic field through the first interface and the second interface.

According to aspects of the disclosure, the common digitizer may be configured to receive the first input or the second input from a stylus through the first interface and the second interface, respectively.

According to aspects of the disclosure, the smart device may comprise a controller configured to process the first input received through the first interface and the second input received through the second interface.

According to aspects of the disclosure, the controller may be configured to provide feedback capable of being displayed by the first interface and the second interface.

According to aspects of the disclosure, the controller may be positioned below the common digitizer.

According to aspects of the disclosure, the first interface may be configured to display feedback in response to the first input received by the common digitizer and the second interface may be configured to display feedback in response to the second input received by the common digitizer.

According to aspects, the first interface may be configured to display feedback in response to the second input received by the common digitizer and the second interface may be configured to display feedback in response to the first input received by the common digitizer.

According to aspects of the disclosure, the first interface, the second interface, and the common digitizer may each be arranged within a common housing.

According to aspects of the disclosure, a system for transmitting input from a user through multiple interfaces to a common digitizer comprises a smart device according to any aspect described herein, a stylus configured to communicate with the common digitizer, and wherein the common digitizer is configured to detect a position of the stylus through the first interface, the second interface, or both of the first interface and the second interface.

According to aspects of the disclosure, the stylus may be configured to generate a magnetic field capable of being detected by the common digitizer through the first interface and/or the second interface.

In the manner described and according to aspects illustrated herein, the smart device and the system are configured to include two user interfaces, which function with a common digitizer, in order to reduce costs associated with manufacture and sale of the smart device.

BRIEF DESCRIPTION OF THE DRAWINGS

Aspects of an embodiment will be described in reference to the drawings, where like numerals reflect like elements.

DETAILED DESCRIPTION

Figure 1:
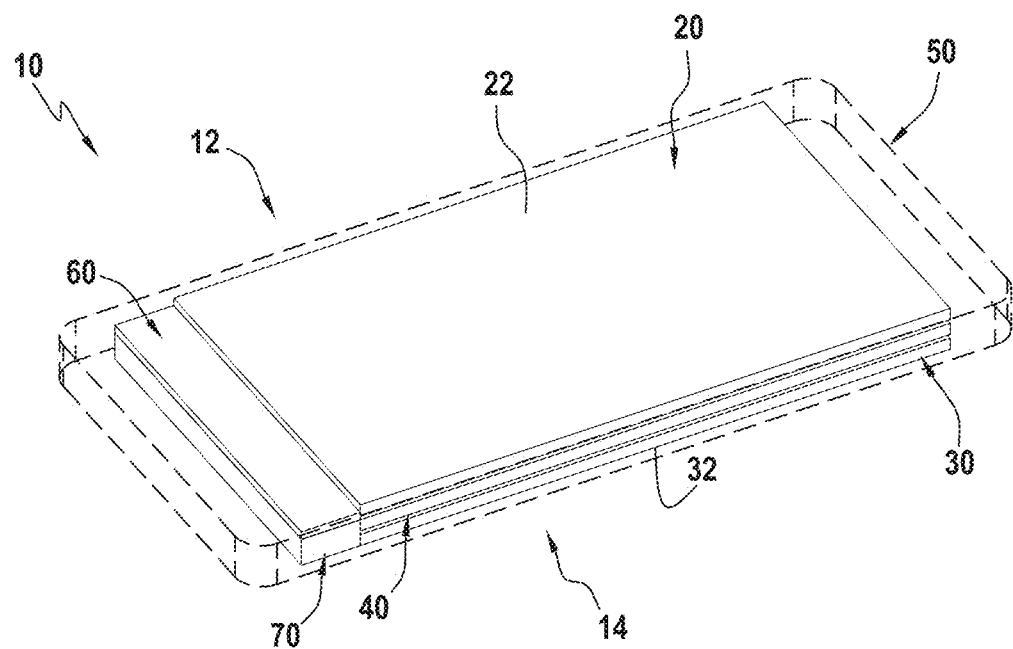
FIG. 1 is a side perspective view of a smart device according to aspects of the disclosure, showing a housing of the smart device in broken lines.

An embodiment of the smart device according to aspects of the disclosure will now be described with reference to FIGS. 1-5. Like numerals represent like parts, and the smart device will generally be referred to by the reference numeral 10. Although the smart device 10 is described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

Figure 4:
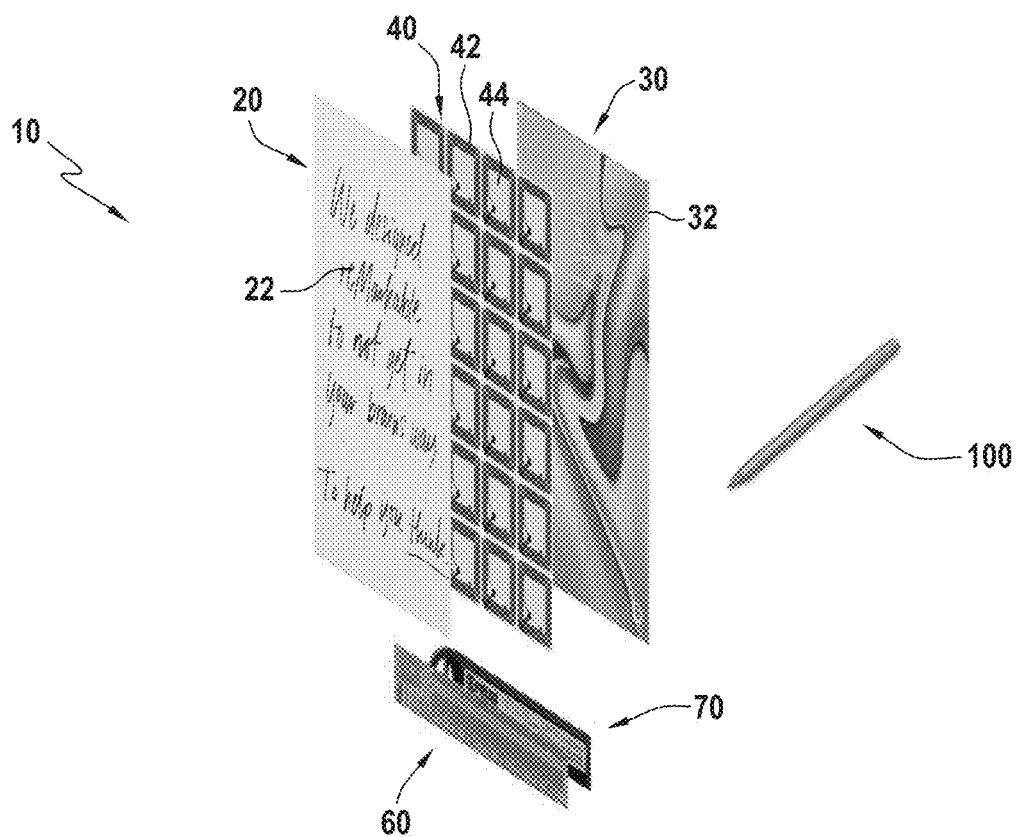
FIG. 4 is an exploded perspective view of an image of the smart device of FIG. 1, shown without the housing of the smart device of FIG. 1.

As shown in FIGS. 1 and 4, the smart device 10 may be configured to display information and/or receive and send information to a secondary device, such as a computer. It is contemplated that the term "smart device" as used herein may be understood to be a mobile device having a mobile operating system and one or more display. Additionally or alternatively, it is contemplated that the term "smart device" as used herein may be understood to be an input device configured to provide data and control signals to an information processing system (computer). In embodiments, the data and control signals may correspond to input from the user in the form of hand-drawn images, animations, and/or graphics. As such, the smart device 10 may be configured to function in combination with a stylus 100 (see FIG. 4). It is contemplated that the term "stylus" as used herein may be understood to be a pen-shaped instrument which may be configured to be detected by the smart device 10. The stylus 100 may be configured to be active or passive. It is contemplated that the smart device 100 may be configured for use with an ElectroMagnetic Resistance (EMR) stylus, an Active ElectroStatic (AES) stylus, a Universal Stylus Initiative (USI) stylus, a Microsoft™ Pen Protocol (MPP) stylus, and/or an Apple™ Mixed Protocol stylus. In embodiments, the stylus 100 may be configured to generate a magnetic field.

Figure 2:
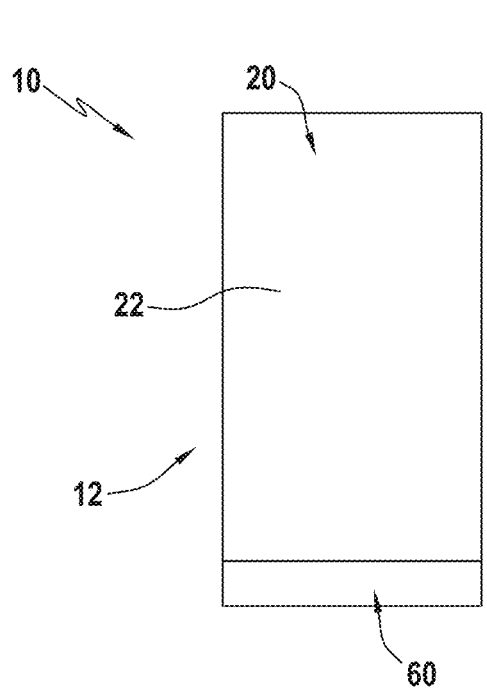
FIG. 2 is a front view of the smart device of FIG. 1, shown without a housing of the smart device of FIG. 1.
Figure 3:
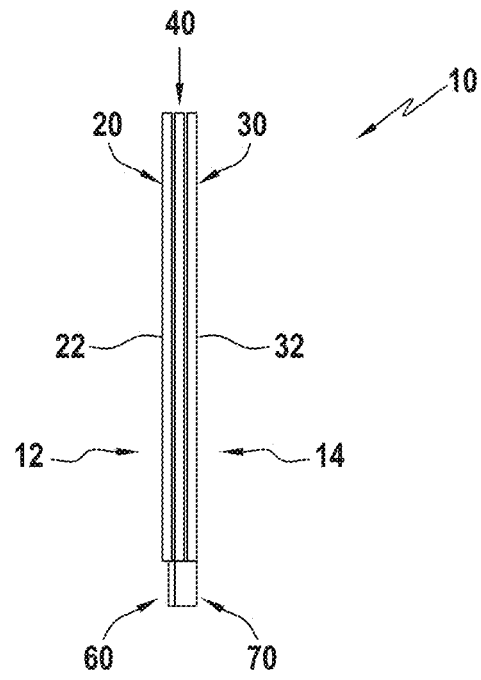
FIG. 3 is a side view of the smart device of FIG. 1, shown without the housing of the smart device of FIG. 1.

As shown in FIGS. 1-3, the smart device 10 may include a first interface 20, a second interface 30, a digitizer 40, a common housing 50, a controller 60, and a battery 70. In embodiments, each of the first interface 20 and the second interface 30 may be configured to function with a common digitizer 40. It is contemplated that the term "common" as used herein may be understood to mean a single component of the smart device 10 having functionality which is shared by more than one other component of the smart device 10. The usage of a common digitizer 40 (referred to hereafter as "the digitizer 40") for both, the first interface 20 and the second interface 30 may reduce costs associated with production of the smart device 10, which may reduce the cost of the smart device 10 for a consumer. The digitizer 40 may be positioned between the first interface 20 and the second interface 30. In embodiments, the digitizer 40 may be positioned between the first interface 20 and the second interface 30 in a sandwiched and/or layered relationship. The sandwiched and/or layered relationship may allow the same digitizer 40 to function with both of the first interface 20 and the second interface 30.

The controller 60 may be configured to receive input from the digitizer 40. Additionally, the controller 60 may be configured to send feedback to the first interface 20 and the second interface 30 which corresponds to the input received from the digitizer 40. In embodiments, the controller 60 may be a printed circuit board (PCB). As shown in FIGS. 1-3, the controller 60 may be positioned within the housing 50, next to an end, or below, the first interface 20, the second interface 30, and the digitizer 40. It is contemplated that the term "below" as used herein may be understood as a position outside of the sandwiched relationship of the first interface 20, the second interface 30, and the digitizer 40, and/or at a position adjacent to or contiguous with the sandwiched relationship of the first interface 20, the second interface 30, and the digitizer 40. Additionally or alternatively, it is contemplated that the term "below" as used herein may be understood as a position lower than the first interface 20, the second interface 30, and the digitizer 40 when the smart device 10 is held by the user in an upright position. The battery 70, which is configured to power the smart device 10, may also be positioned below the first interface 20, the second interface 40, and the digitizer 40, adjacent the controller 60. The positioning of the controller 60 and the battery 70 below the first interface 20, the second interface 30, and the digitizer 40 may allow the first interface 20, the second interface 30, and the digitizer 40 to be oriented in the sandwiched relationship. As such, positioning of the controller 60 and the battery 70 below the first interface 20, the second interface 30, and the digitizer 40 allow the first interface 20 and the second interface 30 to function with the same digitizer 40.

As shown in FIGS. 1 and 4, the first interface 20 may include a first screen 22 and the second interface 30 may include a second screen 32. The first screen 22 and the second screen 32 may each display feedback 62a, 62b to the user which corresponds to input 24, 34 received from the user to the digitizer 40. In embodiments, the first interface 20 and the second interface 30 may each include a liquid crystal display (LCD) and a layer of hardened glass overlaying the LCD. The first interface 20 may be configured to transmit a first input 24 from the user and the second interface 30 may be configured to transmit a second input 34 from the user to the digitizer 40. The first input 24 may be transmitted through the first interface 20 and the second input 34 may be transmitted through the second interface 30. In examples, the first input 24 may be transmitted through the second interface 30 and the second input 34 may be transmitted through the first interface 20. In embodiments, the first interface 20 and the second interface 30 may be configured so that an electromagnetic signal may be transmitted therethrough. The first input 24 may be received by the digitizer 40 through the first interface 20 and the second input 34 may be received by the digitizer 40 through the second interface 30. The smart device 10 may include a first side 12 and a second side 14 opposite the first side 12. The first interface 20 may be configured for use by the user at the first side 12 of the smart device 10 and the second interface 30 may be configured for use by the user at the second side 14 of the smart device 10. As such, the first interface 20 may be positioned opposite the second interface 30 within the housing 50. Additionally, the first interface 20 may face a first direction and the second interface 30 may face a second direction opposite the first direction. The first interface 20 and the second interface 30 may be configured to function simultaneously.

In embodiments, the digitizer 40 may include an electromagnetic resonance (EMR) panel 42 (see FIG. 4). The EMR panel 42 may be configured to emit electromagnetic signals through the first interface 20 and the second interface 30. Together, the electromagnetic signals may form a magnetic field. The magnetic field may be formed beyond the first interface 20 and the second interface 30 at an exterior of the smart device 10. In embodiments, the magnetic field may extend within a range of 0.1 mm to 15 mm beyond the first interface 20 and the second interface 30, but may more specifically extend to 5 mm beyond the first interface 20 and the second interface 30. Additionally, the EMR panel 42 may be configured to detect a magnetic field through the first interface 20 and the second interface 30. In embodiments, the EMR panel 42 is configured to detect the magnetic field generated by the stylus 100. The first input 24, which may be transmitted through the first interface 20, and the second input 34, which may be transmitted through the second interface 30, may each be in the form of the magnetic field generated by the stylus 100. Detection of the magnetic field by the EMR panel 42 may correspond to a position and/or coordinate of the first input 24 at the first interface 20 and a position and/or coordinate of the second input 34 at the second interface 30. As such, the EMR panel 42 is configured to detect a position and/or coordinate of the stylus 100. The EMR panel 42 may include a plurality of sensors 44 which each generate the magnetic field and detect the magnetic field at a preset resonance frequency with the stylus 100. The sensors 44 may be arranged in a series of horizontal axis sensors and a series of vertical axis sensors which overlap and/or alternate in a grid pattern.

It is contemplated that the stylus 100 may include an LC resonance circuit having an inductor (not shown) and a capacitor (not shown) as a main resonance circuit. The inductor may generate current with the magnetic field formed by the EMR panel 42 and may deliver the generated current to the capacitor. As such, the capacitor may be charged with current from the inductor and may discharge the charged current through the inductor. It is also contemplated that the stylus 100 may include a battery configured to power the stylus 100 independent of the smart device 10. The magnetic field of the resonance frequency may be emitted to the inductor. The magnetic field emitted by the stylus 100 may be absorbed by the sensors 44 of the EMR panel 42, such that the position of the first input 24 at the first interface 20 or the second input 34 at the second interface 30 may be determined. As such, if the user brings the stylus 100 within proximity of a particular portion of first interface 20 or the second interface 30, in a contact or hovering manner, corresponding sensors 44 of the EMR panel 42 may sense the magnetic field generated from the stylus.

Figure 5:
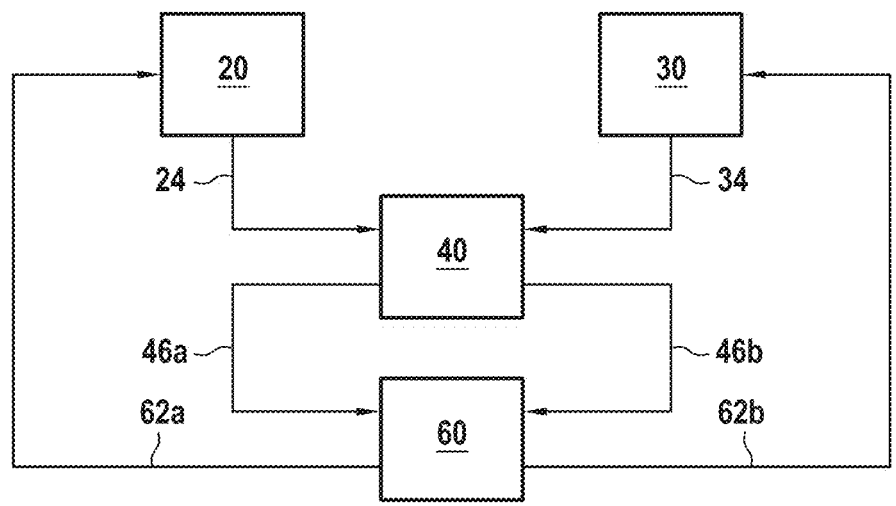
FIG. 5 is a schematic view of the smart device of FIG. 1.

Referring to FIG. 5, in operation, the user may gesture with the stylus 100 to transmit the first input 24 through the first interface 20 and/or the user may gesture with the stylus 100 to transmit the second input 34 through the second interface 30. The first input 24 may be received by the digitizer 40 through the first interface 20 and the second input 34 may be received by the digitizer 40 through the second interface 30. A first signal 46a corresponding to the first input 24 may be sent by the digitizer 40 to the controller 60. Additionally, a second signal 46b corresponding to the second input 34 may be sent by the digitizer 40 to the controller 60. The first signal 46a and the second signal 46b may each be processed by the controller 60. The controller 60 may be configured to provide a first feedback signal 62a and a second feedback signal 62b to the first interface 20 and the second interface 30, respectively. The first feedback signal 62a and the second feedback signal 62b may correspond to the first signal 46a and the second signal 46b, respectively, received from the digitizer 40 and processed by the controller 60. As such, the controller 60 may be configured to provide the first feedback signal 62a to the first interface 20 in response to the first input 24 transmitted through the first interface 20. Additionally, the controller 60 may be configured to provide the second feedback signal 62b to the second interface 30 in response to the second input 34 transmitted through the second interface 30. The first feedback signal 62a provided to the first interface 20 may cause output corresponding to a gesture of the stylus 100 by the user at the first interface 20 to be displayed on the first screen 22. The second feedback signal 62b provided to the second interface 30 may cause output corresponding to a gesture by the user at the second interface 30 to be displayed on the second screen 32. In this manner, the first interface 20 and the second interface 30 may function with the same digitizer 40.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. A smart device comprising:
a first interface configured to transmit a first input from a user;
a second interface configured to transmit a second input from the user;
a common digitizer positioned between the first interface and the second interface;
wherein, the common digitizer is configured to receive the first input from the user through the first interface and the second input from the user through the second interface, wherein the common digitizer includes an electromagnetic resonance panel configured to detect a position and/or coordinate of the first input at the first interface and a position and/or coordinate of the second input at the second interface, the electromagnetic resonance panel including a plurality of sensors each configured to generate a first magnetic field and detect a second magnetic field at a preset resonance frequency, the sensors being arranged in a series of horizontal axis sensors and a series of vertical axis sensors which overlap and/or alternate in a grid pattern, wherein, the first interface is configured to display feedback in response to the second input received by the common digitizer and the second interface is configured to display feedback in response to the first input received by the common digitizer.

2. The smart device of claim 1, wherein the common digitizer is positioned between the first interface and the second interface in a sandwiched relationship.

3. The smart device of claim 1, wherein the electromagnetic resonance panel is configured to generate the first magnetic field through the first interface and the second interface.

4. The smart device of claim 1, wherein the common digitizer is configured to receive the first input or the second input from a stylus through the first interface and the second interface, respectively.

5. The smart device of claim 1, comprising a controller configured to process the first input received through the first interface and the second input received through the second interface.

6. The smart device of claim 5, wherein the controller is configured to provide feedback capable of being displayed by the first interface and the second interface.

7. The smart device of claim 5, wherein the controller is positioned below an end of the common digitizer, and the first interface, the second interface, and the common digitizer are each arranged within a common housing.

8. The smart device of claim 5, wherein the controller is further positioned within the housing, next to an end, or below, the first interface, the second interface, and the digitizer.

9. The smart device of claim 1, wherein the first interface is configured to display feedback in response to the first input received by the common digitizer and the second interface is configured to display feedback in response to the second input received by the common digitizer.

10. The smart device of claim 1, wherein the first interface and/or the second interface are configured so that an electromagnetic signal may be transmitted therethrough.

11. The smart device of claim 10, wherein the electromagnetic signals form the first magnetic field, the first magnetic field extending beyond the first interface and the second interface, at an exterior of the smart device, wherein the first magnetic field extends within a range of 0.1_mm to 15 mm beyond the first interface and the second interface.

12. The smart device of claim 1, wherein the first interface and the second interface are configured to function simultaneously.

13. A system for transmitting input from a user through multiple interfaces to a common digitizer, the system comprising:
a smart device according to claim 1;
a stylus configured to communicate with the digitizer; and
wherein, the common digitizer is configured to detect a position of the stylus through the first interface, the second interface, or both of the first and second interfaces.

14. The system of claim 13, wherein the stylus is configured to generate the second magnetic field capable of being detected by the common digitizer through the first interface and the second interface.

15. The system of claim 13, wherein the second magnetic field emitted by the stylus is absorbed by the sensors of the electromagnetic resonance panel such that a position of the first input at the first interface or the second input at the second interface is determined thereby detecting a position and/or coordinate of the stylus.

16. The system of claim 13, wherein the sensors of the electromagnetic resonance panel are configured to sense the second magnetic field generated from the stylus when a user brings the stylus within proximity of a particular portion of first interface or the second interface, in a contact or hovering manner.

17. The system of claim 13, wherein the stylus includes an LC resonance circuit having an inductor and a capacitor as a main resonance circuit.

18. A smart device comprising:
a first interface configured to transmit a first input from a user;
a second interface configured to transmit a second input from the user; and
a common digitizer positioned between the first interface and the second interface; wherein:
the common digitizer is configured to receive the first input from the user through the first interface and the second input from the user through the second interface, the common digitizer includes an electromagnetic resonance panel configured to detect a position and/or coordinate of the first input at the first interface and a position and/or coordinate of the second input at the second interface, the electromagnetic resonance panel includes a plurality of sensors, the sensors being arranged in a series of horizontal axis sensors and a series of vertical axis sensors which overlap and/or alternate in a grid pattern, each of the plurality of sensors are configured to generate a first magnetic field and to detect a second magnetic field at a preset resonance frequency of an external device, the first interface is configured to display feedback in response to the first input received by the common digitizer and the second interface is configured to display feedback in response to the second input received by the common digitizer, and the first interface is configured to display feedback in response to the second input received by the common digitizer and the second interface is configured to display feedback in response to the first input received by the common digitizer.

19. A smart device, comprising:

a first interface configured to transmit a first input from a user;

a second interface configured to transmit a second input from the user; and a common digitizer positioned between the first interface and the second interface; wherein:

the common digitizer is configured to receive the first input from the user through the first interface and the second input from the user through the second interface, the common digitizer includes an electromagnetic resonance panel configured to detect a position and/or coordinate of the first input at the first interface and a position and/or coordinate of the second input at the second interface, the electromagnetic resonance panel includes a plurality of sensors, the sensors being arranged in a series of horizontal axis sensors and a series of vertical axis sensors which overlap and/or alternate in a grid pattern, each of the plurality of sensors are configured to generate a first magnetic field that extends a predetermined distance beyond the first interface and the second interface at an exterior of the smart device such that the first interface and the second interface are configured to function simultaneously, each of the plurality of sensors are configured to detect a second magnetic field at a preset resonance frequency, the first interface is configured to display feedback in response to the second input received by the common digitizer, and the second interface is configured to display feedback in response to the first input received by the common digitizer.

20. The smart device of claim 19, wherein:

the common digitizer is positioned between the first interface and the second interface in a sandwiched relationship, a controller is configured to process the first input received through the first interface and the second input received through the second interface and provide the feedback in response to the first input and the feedback in response to the second input, the controller is positioned below ends of the first interface, the common digitizer, and the second interface, the controller is a printed circuit board (PCB), the sensors are configured to absorb the second magnetic field, each of the plurality of sensors are configured to detect the second magnetic field when an external device is hovering in proximity to a portion of the first interface or a portion of the second interface, a battery is positioned below the first interface, the common digitizer, and the second interface, and the first interface, the common digitizer, the second interface, the controller, and the battery are provided in a common housing.

* * * * *

UNITED STATES PATENT AND TRADEMARK OFFICE
CERTIFICATE OF CORRECTION

| | | |
|---|---|---|
| PATENT NO. | : 11,507,218 B2 | Page 1 of 1 |
| APPLICATION NO. | : 17/367843 | |
| DATED | : November 22, 2022 | |
| INVENTOR(S) | : Loic Folgoas and Georgios Georgakis | |

It is certified that error appears in the above-identified patent and that said Letters Patent is hereby corrected as shown below:

In the Claims

In Claim 11, Column 8, Line 24, delete "0.1_mm" and insert --0.1 mm--.

Signed and Sealed this
Third Day of January, 2023

*Katherine Kelly Vidal*

Katherine Kelly Vidal
*Director of the United States Patent and Trademark Office*